United States Patent
Kudelski

(10) Patent No.: US 12,278,871 B2
(45) Date of Patent: *Apr. 15, 2025

(54) METHOD TO TRANSMIT MESSAGES BETWEEN A DEVICE AND A REMOTER SERVER

(71) Applicant: NAGRAVISION SARL, Cheseaux-sur-Lausanne (CH)

(72) Inventor: Andre Kudelski, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,897

(22) Filed: Jan. 19, 2024

(65) Prior Publication Data
US 2024/0236193 A1    Jul. 11, 2024

Related U.S. Application Data

(63) Continuation of application No. 18/170,312, filed on Feb. 16, 2023, now Pat. No. 11,917,021, which is a
(Continued)

(30) Foreign Application Priority Data

Jul. 30, 2018    (EP) .................................... 18186373

(51) Int. Cl.
*H04L 67/141* (2022.01)
*H04L 51/48* (2022.01)
(Continued)

(52) U.S. Cl.
CPC ............ *H04L 67/141* (2013.01); *H04L 51/48* (2022.05); *H04L 67/1034* (2013.01); *H04W 4/80* (2018.02)

(58) Field of Classification Search
CPC ... H04L 67/141; H04L 51/48; H04L 67/1034; H04L 51/214; H04L 51/046; H04W 4/80
See application file for complete search history.

(56) References Cited

U.S. PATENT DOCUMENTS 6,493,758 B1    12/2002 McLain
6,496,824 B1    12/2002 Wilf
(Continued)

FOREIGN PATENT DOCUMENTS

WO    WO 2017/030520 A1    2/2017
WO    WO 2018/049971 A1    3/2018

OTHER PUBLICATIONS

European Search Report issued Jan. 9, 2019 in European Application 18186373.9, filed on Jul. 30, 2018 (with Written Opinion).
(Continued)

*Primary Examiner* — Oanh Duong
(74) *Attorney, Agent, or Firm* — Oblon, McClelland, Maier & Neustadt, L.L.P.

(57) ABSTRACT

In order to allow an access to the Internet, and therefore to a remote server, for a device having no connection with an Internet gateway, a method is provided to transmit a message from a first device to a remote server, the first device having no connection with the remote server. The method includes detecting a second device by the first device, establishing a communication channel between the first and the second device, transferring the message from the first to the second device, the message comprising an address of the remote server, and transferring, by the second device, the message to the remote server using the remote server address contained in the message.

14 Claims, 2 Drawing Sheets

Figure 1:
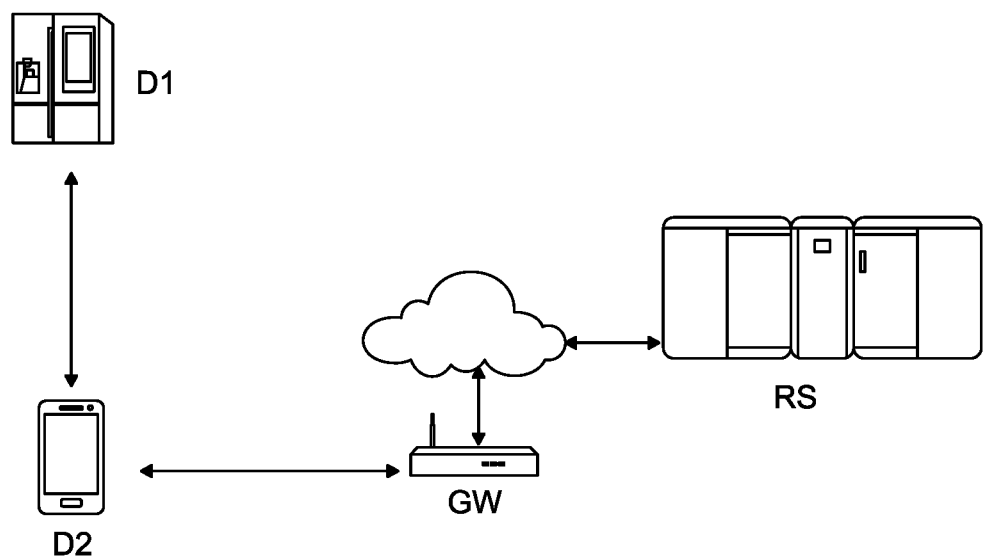

Related U.S. Application Data continuation of application No. 17/575,757, filed on Jan. 14, 2022, now Pat. No. 11,622,011, which is a continuation of application No. 16/524,462, filed on Jul. 29, 2019, now Pat. No. 11,252,240.

(51) Int. Cl.
*H04L 67/1034* (2022.01)
*H04W 4/80* (2018.01)

(56) References Cited

U.S. PATENT DOCUMENTS

| | | |
|---|---|---|
| 9,055,400 B1 | 6/2015 | Lee |
| 9,066,197 B2 * | 6/2015 | Kiukkonen ......... H04W 52/028 |
| 9,554,262 B2 | 1/2017 | Johnsson |
| 9,565,513 B1 | 2/2017 | Malek et al. |
| 9,674,640 B2 | 6/2017 | Mannan |
| 9,900,172 B2 | 2/2018 | Goel et al. |
| 9,930,506 B2 | 3/2018 | Cronholm et al. |
| 10,499,452 B2 | 12/2019 | Kim et al. |
| 10,560,971 B2 | 2/2020 | Seo |
| 11,252,240 B2 | 2/2022 | Kudelski |
| 2011/0173324 A1 | 7/2011 | Wang |
| 2012/0151067 A1 | 6/2012 | Piccinini et al. |
| 2012/0155348 A1 | 6/2012 | Jacobson |
| 2013/0022031 A1 | 1/2013 | Sivertsen |
| 2014/0105083 A1 | 4/2014 | Krishnaswamy et al. |
| 2014/0225603 A1 | 8/2014 | Auguste et al. |
| 2015/0172902 A1 | 6/2015 | Kasslin et al. |
| 2015/0286984 A1 * | 10/2015 | Dikman ............... G06Q 10/087 705/28 |
| 2016/0135242 A1 | 5/2016 | Hampel et al. |
| 2016/0165644 A1 * | 6/2016 | Yang ....................... H04L 65/40 370/328 |
| 2018/0213379 A1 | 7/2018 | Xiong et al. |
| 2018/0295556 A1 | 10/2018 | Baek et al. |
| 2019/0150093 A1 | 5/2019 | Kweon et al. |
| 2019/0246346 A1 | 8/2019 | Huang et al. |
| 2019/0373653 A1 | 12/2019 | Kwon |
| 2020/0005557 A1 | 1/2020 | Madaan |
| 2020/0336906 A1 * | 10/2020 | Belhareth ........... H04L 65/1069 |

OTHER PUBLICATIONS

European Office Action issued May 18, 2021 in European Patent Application No. 18186373.9, 4 pages.

* cited by examiner

METHOD TO TRANSMIT MESSAGES BETWEEN A DEVICE AND A REMOTER SERVER

RELATED APPLICATIONS

This application is a continuation of U.S. application Ser. No. 18/170,312, filed on Feb. 16, 2023, which is a continuation of U.S. application Ser. No. 17/575,757, filed on Jan. 14, 2022, now U.S. Pat. No. 11,622,011, issued Apr. 4, 2023, which is a continuation of U.S. application Ser. No. 16/524,462, filed on Jul. 29, 2019, now U.S. Pat. No. 11,252,240, issued Feb. 15, 2022, which claims priority of European Application No. 18186373.9, filed on Jul. 30, 2018. The entire disclosure of the prior applications are hereby incorporated by reference in their entirety.

INTRODUCTION

More and more devices are now connected to the Internet. The Internet of Things tends to spread throughout our home in order to bring additional functionalities to the devices. We can find ovens, fridges, or even bedside lamps. The connection with Internet allows a better optimization of the device (e.g. power consumption), a remote control of the device or an upgrade of their functionalities.

However, the location of these devices could be in a range inaccessible to the Internet connection and the possibilities offered by a connection with Internet are not used. This is particularly the case for devices having low power wireless transmitter (and thus low range) since they are battery powered.

BACKGROUND

In order to bring Internet connection to the various area of a home, different solutions are proposed. The first one is to install a WiFi repeater that extends the Wifi coverage. The wireless signal is received by the repeater from the main Wifi gateway and re-transmitted so that devices within range of the repeater have access to the Internet.

A second solution is based on the use of the electrical wiring to bring the Internet signal to a remote place. It is known as Powerline or Home plug connection. Power line networking basically turns a building's existing electrical wiring (i.e. the wires that carry electricity to different outlets in the house) into network cables, meaning they also carry data signals for a computer network. And this means virtually all households, can be "wired for" power line networking.

However, these solutions are in some cases not applicable or costly.

SUMMARY

In order to allow an access to the Internet, and therefore to a remote server, for a device having no connection with an Internet gateway, there is proposed a method to transmit a message from a first device to a remote server, the first device having no connection with the remote server, said method comprising:
  detecting a second device by the first device,
  establishing a communication channel between the first and the second device,
  transferring the message from the first to the second device, said message comprising an address of the remote server,
  transferring, by the second device, the message to the remote server using the remote server address contained in the message.

The second device is preferably a portable device that can be temporarily in the vicinity of the first device and therefore can establish a connection with the first device. During the connection session between the first device and the second device, the information, in the form of a message, that the first device is willing to communicate with a remote server, is transferred to the second device. The message comprises the address of the remote server and an identifier of the first device. The second device stores the message.

At a later time, when the second device has the possibility to communicate with a gateway, the second device transmits the message to the remote server using the address contained in the message.

SHORT DESCRIPTION OF THE FIGURES

Figure 2:
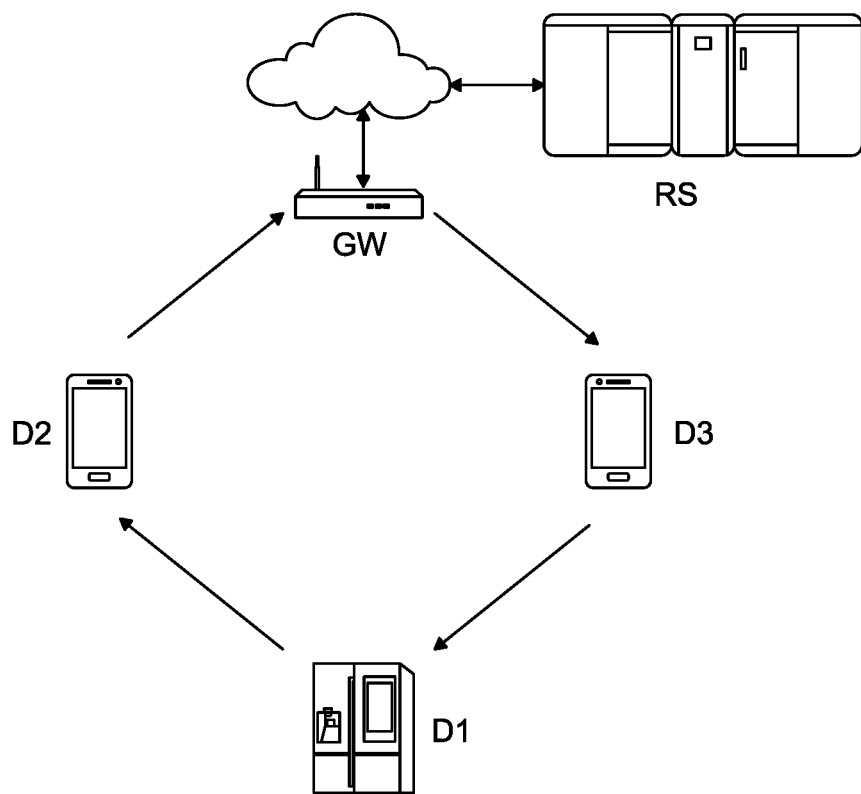
Figure 3:
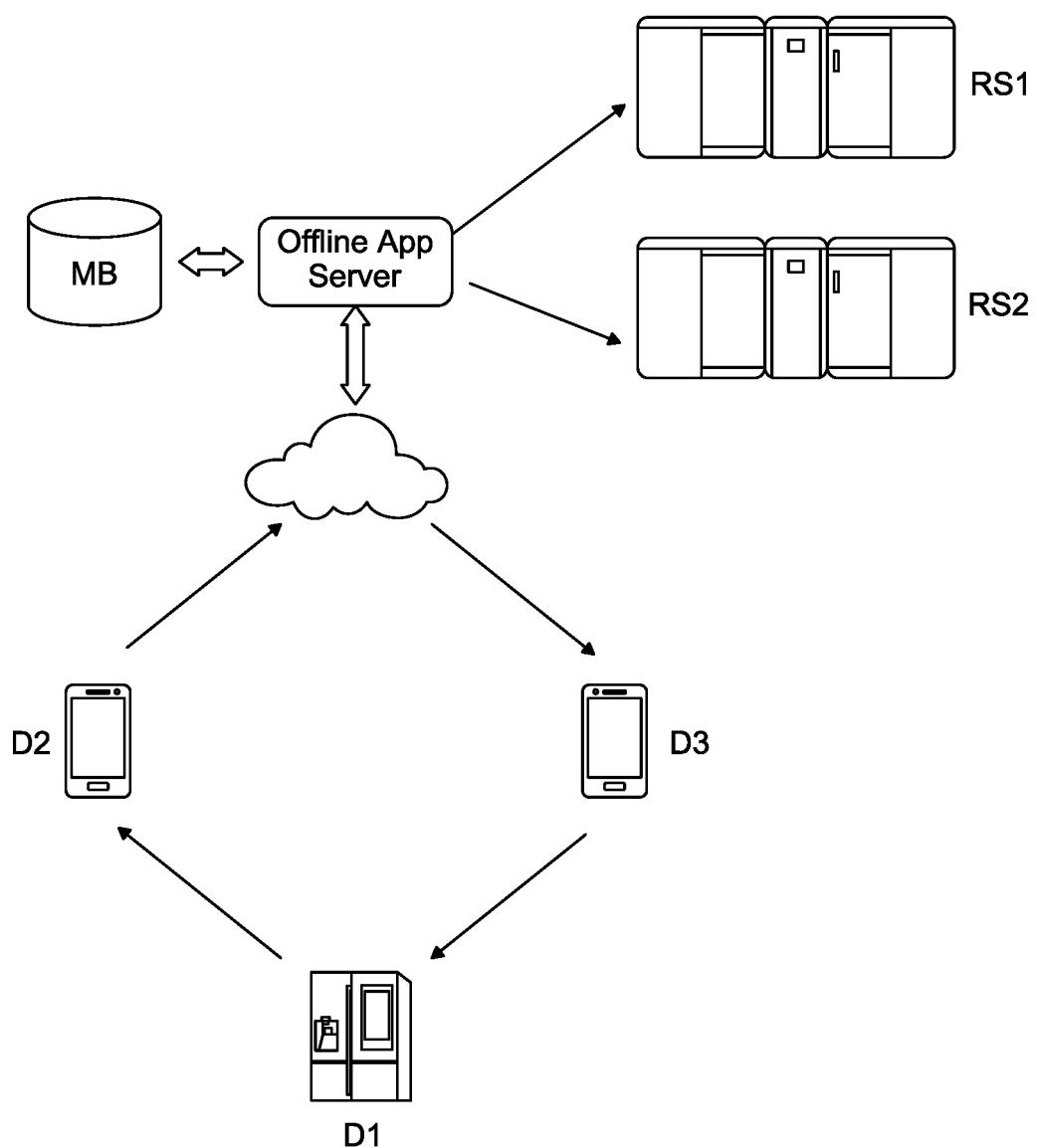

The present description will be better understood thanks to the attached figures in which:
  FIG. 1 illustrates the way the messages are communicated from and to a non-connected device.
  FIG. 2 illustrates a third device used to send a response message to the first device,
  FIG. 3 illustrates an embodiment with a network server used as buffer for the communication with the remote server.

DESCRIPTION

FIG. 1 illustrates a first device D1 which is out of range of a gateway GW or any other connection capability (such as 4G) connected to the Internet. Therefore, the first device D1 cannot communicate with a remote server RS to report and obtain further information. The gateway GW is preferably a WiFi gateway using wireless communication with the devices in range.

The gateway GW has registered the second device D2 and the third device D3 as devices in range. These devices have already exchanged information with the gateway GW and the latter has registered their addresses such as the IP addresses. The second device has a second device address AD2 and the third device has a third device address AD3. These two addresses are known by the gateway GW, and used later to push messages to the first device D1.

During normal operation of the gateway GW, the gateway GW is connected to several devices such as the second device D2 and third device D3. Data are exchanged with various remoter servers from these devices to read e-mails, send short messages or watch videos. All devices using the gateway GW to access the Internet are therefore registered by the gateway as local devices. Registered devices are devices that have the authorization to use the gateway GW. In a preferred embodiment, the access to the gateway GW is subject to an authorization. A known method is to enter a password into the device to enable the authorization with the gateway.

The first device D1 is, in the example illustrated at FIG. 1, a fridge. The first device could be any device or appliance used in a home, an office, a factory. The first device may be of a first type which is connectable to the mains power supply and thus has no restriction as far as energy is concerned. The first device may also be of a second type which is battery powered and in which special attention is taken to reduce the consumption of its wireless transmitter.

Due to the location of the first device D1, the latter has no access to the gateway GW, since it is out of range of the wireless coverage of the gateway.

When the first device D1 is willing to communicate with a remote server RS, the first device enables its wireless transmitter in the case where it was disabled for energy saving. Various types of wireless transmitter can be used for the purpose of connecting to the remote server. According to a first embodiment, the wireless transmitter is of Wifi type (IEEE 802.11).

The wireless transmitter of the first device is ba default in client device mode, i.e. in a mode to try to connect to Internet either via a Wifi gateway or via a 3G, 4G connection. The first device, after having tried to connect to the Internet and failed, changes its mode into router mode or hotspot mode. As a consequence, a second device D2 being in the vicinity of the first device D1 will connect to the first device D1 believing that the first device is a hotspot router to the Internet. This connection is made automatically since the second device encounters the same problem as the first device and cannot connect to the gateway. The second device will then try to find another router to continue having access to the Internet and therefore connects to the first device.

The second device D2 establishes a connection with the first device D1 and the message is then passed from the first device to the second device. In one particular embodiment, the first device sends an instruction to the second device D2 to enter into a message relay mode.

If not already pre-loaded, a relay application is loaded into the second device D2 to relay messages. This application is launched when the second device D2 receives the instruction from the first device D1. Once the communication between the first and the second device is established, the first device can pass a message to the second device. This message is stored into the second device D2. The message comprises a payload and a header, the header comprising an identifier of the first device D1 and the address of the remote server RS.

The second device D2 is preferably a portable device. The holder of the second device D2 then moves to an area where the gateway GW is in-range. The second device D2 connects with the gateway GW and access the Internet through the gateway. The relay application in the second device then transmits the message to the remote server RS using the address of the remote server RS contained in the message.

Since the message contains the identifier of the first device D1, the remote server RS can prepare and send a response message to the second device intended for the first device if such a response is needed. The message contains the identifier of the first device and a payload. This response message is then stored in the second device, preferably in the relay application of the second device.

Once the second device D2 is in the vicinity of the first device, a connection between these two devices is established and the response message is passed to the first device by the second device. At that time, the first device has the possibility to send another message to the second device.

The key of this embodiment is the operating mode of the first device. In the case where the first device cannot have access to Internet, its mode is changed to "router mode" or "hotpot mode". Thus the other devices in the vicinity of the first device automatically connect to the first device if no other connection to a gateway is available. This connection allows the first device to communicate with the second device. Thus the first device may send messages to and/or receive messages from the second device.

In an alternate embodiment, the second device, while in the vicinity of the first device, can still have a connection with the gateway GW. One task of the relay application loaded into the second device is to obtain the identifiers of the hotspots accessible by the second device.

TABLE 1

| Hotspot name | Strength | Open/Closed | Connected |
|---|---|---|---|
| HomeGW | 2 | Closed | ok |
| RemoteRelay | 3 | Open | |

Table 1 shows a list of available hotspots or networks obtained by the relay application of the second device. "HomeGW" is the network name of the gateway GW and the second device is still connected (see last column) to this network. A device, such as the first device, willing to relay information has turned its Wifi transmitter into hotspot mode and uses the network name "RemoteRelay". The relay application in the second device detects the network name "RemoteRelay" and requests the second device to disconnect temporarily from the "HomeGW" to connect into the "RemoteRelay". The communication with the first device can then take place and the message transferred from the first to the second device as explained before. Once the communication with the first device is over, the connection with the network "RemoteRelay" is terminated and the second device connects with the "HomeGW" network.

In the example of the table 1, the Open/Closed status is marked "Open", i.e. no encryption is used on the transfer on the message. However, it is possible that the type of connection with the network "RemoteRelay" being closed and subject to a password. The relay application has the password loaded into its memory and the password is used by the second device in establishing the connection with the network "RemoteRelay" of the first device.

In the case where a plurality of devices do not have access to the Internet, a first device can use the network name "RemoteRelay269", the last three digits being the last digits of the serial number of the first device for example. Another device will use the network name "RemoteRelay189". The second device detects the predefined name "RemoteRelay" as the first portion of the network name and connects to each of the "RemoteRelayxxx" to obtain the messages from each devices not having access to the Internet.

In another embodiment, the first device D1 has a Bluetooth communication module and connects with the second device D2 via Bluetooth. The message is transferred during a Bluetooth connection with the second device and if a response message is already stored in the second device, this response message is passed to the first device. The second device D2, when a connection with the gateway GW is available, extracts from the message the address of the remote server and transmits (and/or receive) the message to the remote server.

In one particular embodiment, the second device D2 is connected to Internet via a 3G, 4G connection. The same mechanism applies by the detection of the hotspot mode of the first device, even if the connection to the 3G, 4G connection is still active.

In another embodiment, a third device D3 is connected to the gateway GW to have access to the Internet. The gateway GW comprises a gateway relay application in charge of relaying the messages to the first device. When the second device D2 sends the message of the first device to the remote server RS, a response message is sent by the remote server to the second device through the gateway. The gateway detects in the header of the response message that the response message is intended for the first device and stores a copy of the response message. The copy of the message is sent to the third device D3 by the gateway GW. As the result, the response message will be stored into the second and the third device.

As soon as one of these two devices is in the vicinity of the first device (e.g. the third device), a communication is established (in one or the other mode described above) and the response message is transferred to the first device. The third device, once in communication with the gateway notifies the gateway of the successful transfer of the response message to the first device.

The response message can be deleted from the gateway and a notification is sent to all other devices having received the response message (such as the second device) to request the cancellation of the response message.

The examples above are given is respect to two devices but can be extended to more than two devices. These devices have in common that the replay application in loaded into their memory. Any of the devices can be used to receive a message from the first device and send it to the remote server through the gateway. Since the gateway copies the response message to all devices having the replay application, any of the devices, in the vicinity of the first device, can transmit the response message to the first device.

According to an embodiment, the messages can further have an expiration date. In the header of the message, an expiration date is added by the first device. In case that the second device was not in a position to transmit the message before the expiration of the expiration date, the second device deletes the message. In the same manner, the response message can have an expiration date. Once one of the devices has received and stored the response message in its memory, the device can automatically delete the message should the expiration date being reached.

It is to be noted that a mobile device such as the second device can be in connection with several first devices or appliances, i.e. devices having no access to the Internet. The relay application of the mobile device can be in communication with a first appliance D1A and store a first message and then in communication with a second appliance D1B and store a second message. At the time the mobile device can connect to the gateway, the first message is sent to a first remote server, according to the address contained in the first message, and the second message is sent to a second remote server according to the address contained in the second message.

In the same manner, the first remote server sends a first response message intended for the first appliance D1A which is stored by the mobile device. The second remote server sends a second response message intended for the second appliance D1B which is stored by the mobile device. When the mobile device is able to connect with the first appliance D1A, the first response message is transferred to the first appliance D1A. The same is valid for the second appliance.

The messages sent to a remote server can be of any type. It could be data collected by the first device such as the temperature, pressure or the value of any metering device. The response sent by the remote server can be setting up operational parameters, update the embedded software, updating information displayed on a screen of the first device.

The FIG. 3 illustrates another example in which the relay of the messages is made by an Offline Application Server connected to Internet. The second and third devices can be connected to Internet via a gateway GW or directly via 3G, 4G connection. At least the second and the third device share a network identifier allowing to play the relay for messages to or from the first device. The network identifier is preferably stored in the relay application loaded into the second and third device.

During an initialization phase, the second and the third devices connect to the Offline Application Server to setup a common network identifier. It is not necessary that the first device has access to the Offline Application Server as long as the second and third devices are known by the Offline Application Server.

When the first device D1 has transmitted a message to the second device D2, the second device D2 connects to the Offline Application Server to pass the message. The Offline Application Server transmits the message to the remote server RS1, RS2 according the address contained in the message. The message transmitted by the second device D2 to the Offline Application Server also contain the network identifier so that the Offline Application Server can store the response of the remote server in its database MB in respect for this particular network identifier. According to one embodiment, the return message, if available directly, will be sent to the second device and stored by the Offline Application Server. In case that the third device connects to the Offline Application Server at a later stage, and identifies itself with the network identifier, the Offline Application Server can transmit to the third device the same message as sent to the second device.

The second or the third device can connect time to time to the Offline Application Server to check if messages are to be forwarded to a first device. This connection request comprises the network identifier and the Offline Application Server can check if pending messages are stored in its database in relation with this particular network identifier.

In the positive event, the response message is passed to the second or third device with the address (or identification) of the first device. For the example below, we will consider the case with the third device.

This return message is buffered into the third device, waiting a connection with the first device. When the third device is in wireless range with the first device, the return message is passed to the first device by the third device.

The invention claimed is:

1. A method to transmit a message from a first device to a remote server, wherein the first device comprises a wireless transmitter having a first mode being a client device mode and a second mode being a hotspot mode, said method comprising:
   turning the wireless transmitter of the first device into the hotspot mode,
   establishing a communication channel between the first device and a second device using the hotspot mode,
   after establishing the communication channel, transferring the message from the first device to the second device, said message comprising an address of the remote server and an identifier of the first device, and
   connecting the second device to the remote server using the remote server address contained in the message, and transferring, by the second device, the message to the remote server.

2. The method of claim 1, wherein, a return message is sent by the remote server for the first device, the return message comprising the first device identifier, and the method further comprises:

receiving, by the second device, the return message from the remote server, and buffering, by the second device, the return message until the first device is detected, and transferring the return message to the first device.

3. The method of claim 2, wherein the return message further comprises an expiration date, and said return message is transmitted to the first device by the second device when a current date is prior to the expiration date.

4. The method of claim 1, wherein the first device comprises a Bluetooth receiver/transmitter, and the transferring from the first device to the second device comprises transferring the message between the first and second device via a Bluetooth connection.

5. The method of claim 1, wherein the second device comprises a relay application, and said application detects the Wireless transmitter in the hotspot mode of the first device and stores the message.

6. The method of claim 1, wherein the wireless transmitter in the hotspot mode of the first device has a hotspot name comprising at least a part which is a predefined name, and the method further comprises detecting, by the second device, the predefined name of the Wireless wireless transmitter, and in response of a successful detection:

disconnecting a wireless transmitter of the second device from a current hotspot, and connecting the wireless transmitter of the second device to the wireless transmitter of the first device.

7. The method of claim 1, wherein the message further comprises an expiration date, and the transferring to the remote server comprises transferring the message to the remote server by the second device when a current date is prior to the expiration date.

8. The method of claim 1, wherein the second device is a portable device.

9. The method of claim 1, wherein the turning step comprises:

determining that the first device is unable to connect to the remote server while in the first mode; and in response to determining that the first device is unable to connect to the remote server, turn the wireless transmitter into the hotspot mode.

10. The method of claim 1, wherein the step of transferring the message comprises transmitting the message from the first device to the second device, the message including an instruction instructing the second device to enter a message relay mode.

11. A method to transmit a message from a first device to a remote server, the first device having no connection with the remote server, said method comprising:

establishing a communication channel between the first device and a second device, and after establishing the communication channel, transferring the message from the first device to the remote server via the second device, said message comprising an address of the remote server and an identifier of the first device, wherein the remote server is in connection with an Offline Application Server, said method further comprising:

transferring the message via the second device to the remote server and the Offline Application Server, receiving a response message by the Offline Application Server from the Remote server, and transmitting the response message from the Offline Application Server to the second device, and said second device buffering the response message until the first device is detected.

12. The method of claim 11, wherein the first device, the second device, and a third device share a network identifier, said message further comprising the network identifier, said response message comprising the network identifier and the first identifier, and said method further comprising:

storing, by the Offline Application Server, the response message in a database, receiving, by the Offline Application Server, a connection request comprising the network identifier from the third device, retrieving the response message from the database and sending the response message to the third device, and buffering, by the third device, the response message until the first device is detected, and transferring the response message to the first device.

13. A device configured to communicate with a remote server, the device comprising:

a wireless transmitter having a client mode and a hotspot mode; and processing circuitry configured to:

turn the wireless transmitter into the hotspot mode, establish a communication channel between the device and another device using the hotspot mode, after establishing the communication channel, transfer the message from the device to the another device, said message comprising an address of the remote server and an identifier of the device, and connect the another device to the remote server using the remote server address contained in the message, wherein the device transfers, via the another device, the message to the remote server.

14. The device of claim 13, further comprising a Bluetooth receiver/transmitter, wherein the processing circuitry is further configured to transfer the message between the device and the another device via a Bluetooth connection.

* * * * *